Jan. 13, 1953   J. E. MASSEY   2,625,134
ANTIBREEDING SHIELD AND HARNESS FOR BULLS
Filed Jan. 10, 1951

INVENTOR
JOHN E. MASSEY
BY Mawhinney & Mawhinney
ATTORNEYS

Patented Jan. 13, 1953

2,625,134

UNITED STATES PATENT OFFICE 2,625,134

ANTIBREEDING SHIELD AND HARNESS FOR BULLS

John E. Massey, North Garden, Va.

Application January 10, 1951, Serial No. 205,385

3 Claims. (Cl. 119—143)

The present invention relates to improvements in anti-breeding shields and harness for bulls and has for an object to provide a device to be applied to bulls to prohibit them from entering into intercourse with female cattle.

Another object of the present invention is to provide a device for eliminating unseasonable calfing which has been a serious problem confronting both the dairy and beef cattle industries.

A further object of the present invention is to provide a device which will prohibit a bull, when traveling with a herd of cattle, from having intercourse with offspring of which he was the sire. It has been observed in the field of husbandry that if a bull has intercourse with his own offspring, the result will be a weakening of the strain of cattle and can result in eventually an almost sterile stock, the second or third generation sired by the same bull being subject to continuously losing its calves.

A still further object of the present invention is to provide a shield and accompanying harness for retaining such shield in proper position to prohibit entry of the bull into intercourse with the female of the specie when such a union is not desired. It is essential that the apron or shield be retained in a blocking position interposing a barrier to an attempted union by the bull with a cow and it is essential that such harness co-operate with the shield in such a manner that the bull cannot by rubbing up against the fence, trees or the like cause the shield to be dislodged or moved out of place, yet this harness for holding the shield in place must permit of expansion and contraction of the body of the bull due to breathing, eating and growing in a manner not to render the beast wholly uncomfortable.

A still further object of the present invention is to provide a device as described above the apron or shield of which may be raised and retained out of a blocking position when it is desired to breed the bull without the necessity of removing the harness for such short or sporadic occasions.

With the foregoing and other objects in view, the invention will be more fully described hereinafter, and will be more particularly pointed out in the claims appended hereto.

In the drawings, wherein the symbols refer to like or corresponding parts throughout the several views, Figure 1 is a perspective view of a bull having the harness and shield installed in operative position thereon.

Figure 1:
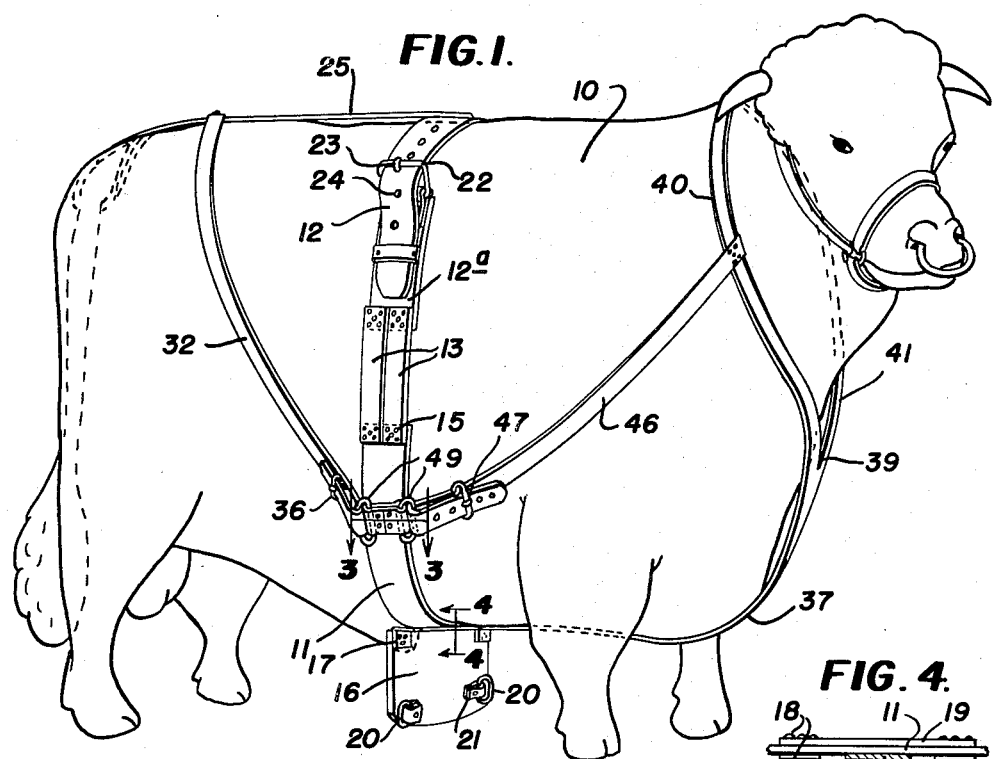
Figure 4:
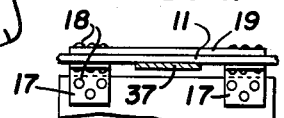
Figure 4 is an enlarged vertical sectional view taken on the line 4—4 in Figure 1.

Referring more particularly to the drawings 10 designates a bull having about its medial portion a belly band 11 which extends upwardly partially about the sides of the beast. A back band 12 passes over the back of the animal in vertical alignment with the belly band 11 and consists of two lengths of material 12 and 12a. The belly band is joined to the back band by pairs of expansible bands 13 and 14, the lower ends of the bands 13 being secured to one of the upper ends of the belly band 11 as by stitching or rivets 15 while the upper ends of the expansible bands 13 are secured to the lower end of the back band section 12a. The expansible bands 14 are secured to the opposite end of the belly band 11 as by stitching or rivets 15 and to the back band 12 in a similar manner. The upper end of the back band section 12a carries thereon a buckle 22 having a tongue 23 for passing through openings 24 in the free end of the back band section 12. Depending from the belly band is a shield or apron 16. The shield 16 is secured to the belly band by a pair of hinges 17 of appreciable width which may be in the form of a strip of stock leather one end of which is secured to the shield 16 and the other end of which is secured to the belly band 12 by rivets 18. A backing or reinforcing strip 19 is provided between the animal and the belly band and extends over the length of the shield. This backing strip 19 co-operates with the belly band 11, hinges 17 and shield 16 to provide extreme transverse and longitudinal rigidity to the apron in order that the same may not be twisted or rocked out of its barrier position. The shield 16 is provided proximate its free end with a pair of rings 20 secured thereto by retainers 21 which may be riveted or otherwise secured to the shield. These retainer rings are provided for raising the shield from the barrier position to a mating or union position as will be described more fully hereinafter.

The belly band 11 and shield 16 carried thereby is prohibited from sliding forward by a crupper strap 25 carried by the upper portion of the back band 12 and passing along the back of the beast and beneath its tail. The rear extremity of the crupper strap is of bifurcated construction one leg of which is provided with a plurality of openings 27 for receiving therethrough the tongue 28 of a buckle 29 carried by the other leg 30 of said bifurcated construction. Secured to the crupper strap proximate the legs 26 and 30 are a pair of strut straps 31 and 32. The strap 31 constitutes a rear fixed strut strap by reason of the same being secured at its lower end to the left upper portion of the belly band 11 and to the crupper strap 25. The strut strap 32 constitutes a rear adjustable strut strap in that the same is secured at one end to the crupper strap 25 and carries at the other end a tongue 33 having openings 34 for receiving therethrough a tongue 35 of a buckle 36 carried by a lower portion of the adjustable strut strap 32.

The belly band 11 and shield 16 carried thereby are prohibited from sliding rearwardly of the animal by a yoke strap 37 secured to the belly strap between the hinges 17 and secured to the belly band by stitching or rivets 38. The yoke strap 37 extends forwardly beneath the chest of the animal and passes beneath the two front legs and extends upwardly towards the head of the beast. This yoke strap 37 is bifurcated at 39 and provides two arms 40 and 41 which pass around opposite sides of the animal's neck. The arm 40 is provided with a plurality of openings 42 proximate the end thereof which openings receive therethrough a tongue 43 of a buckle 44 secured to the free end of the arm 41. This construction locks the strap about the neck of the beast and provides an anchor against the longitudinal rearward pull of the shield. Secured to the yoke strap at approximately the intermediate portion of the arms are a pair of strut straps 45 and 46. The strap 45 constitutes a forward or front fixed strut strap by reason of the same being secured at its lower end to the left upper portion of the belly band 11 and to the arm 41 of the yoke strap 37. The strut strap 46 constitutes a forward or front adjustable strut strap in that the same is secured at one end to the arm 40 of the yoke strap 37 proximate the intermediate portion thereof and carries spaced from the other end a tongue 37 having openings 48 for receiving therethrough a tongue 49 of a buckle 50 secured to a lower portion of the adjustable strut strap 46.

Figure 3:
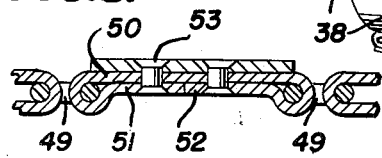
Figure 3 is an enlarged horizontal section taken on the line 3—3 in Figure 1.

The lower portions of the adjustable strut straps 32 and 46 provide together with their tongues and buckle loops receivable through a pair of retaining rings 49 which are carried by the upper right end portion of the belly strap 11 by a leather retainer 50 which is folded over upon itself in two legs 51 and 52 and then secured to the belly band 11 by rivets 53. This construction can be more readily seen in Figure 3.

Figure 2:
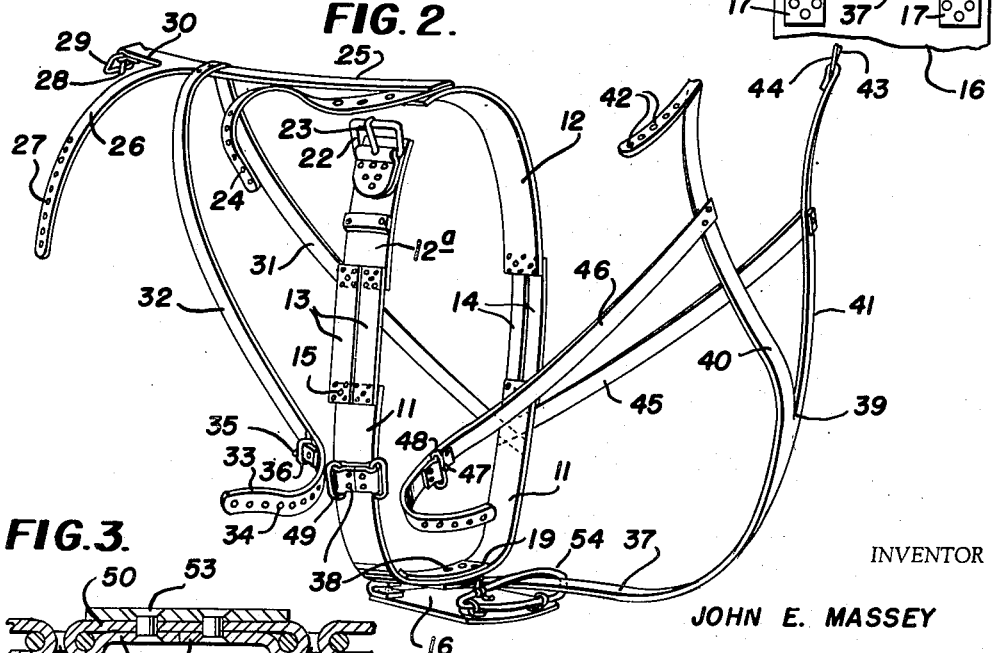
Figure 2 is a perspective view of the shield supporting harness with the shield raised to the breeding position.

In operation the shield and harness is applied to the bull as follows. The adjustable strut straps 32 and 46 are disconnected from the retaining rings 49 and the section 12 of the back band is disconnected from the section 12a and the entire harness is layed out on the ground with the belly band 11 and back straps 12 and 12a in one line transversely of the spot over which the bull is to be walked. The bull is then led over the harness in such a manner that his left front leg is placed between the yoke strap 37 and the front fixed strut strap 45. The yoke strap 37 is raised with the arms 40 and 41 passed around the neck of the bull and the end of the arm 40 passed through the buckle 44 in such a manner that the tongue 43 passes through one of the openings 42 to retain the yoke strap 37 in place. This will raise the belly band 11 towards the stomach of the animal. The front adjustable strut strap 46 is then connected to the upper right hand end of the belly band 11 by passing the free end of the strap 46 through the forward retaining ring 49 and securing the same to the buckle 48. The back strap 12 is then thrown over the bull from the left side and secured to the right hand side section 12a of the back band by passing the tongue 23 of the buckle 22 through an appropriate opening 24 in the back strap thereby regulating the height of adjustment of the shield or apron 16. The crupper strap 25 is then secured about the tail of the animal by raising the tail and passing the leg 26 of the crupper strap beneath the tail and through the buckle 29 engaging the tongue 28 of the buckle 29 in the appropriate opening 27 of the crupper strap 25 for retaining the same in the proper adjusted longitudinal position. The rear adjustable strut strap 32 is then secured to the upper right hand end of the belly band 11 as by passing the tongue 33 through the retaining ring 49 and registering the tongue 35 of the buckle 36 with the desired opening 34 in the strap 32. This procedure will place the shield and harness on the bull in a manner illustrated in Figure 1, however when it is desired to breed the bull, without the necessity of removing the harness, the shield or apron 16 is raised from its free end toward the belly of the animal in the manner shown in Figure 2 and a retaining member 54 passed through the rings 20 and between the chest of the animal and yoke strap 37 for retaining the shield 16 in a raised position. This may also be accomplished by passing a rope or the like over the back of the animal one end of which would be connected to the right hand ring 20 and the other end passed up over the back of the animal and roved through the left hand eye 20 and the rope secured. The normal position of the device will be shown in Figure 1.

What I claim is:

1. An anti-breeding shield and harness for bulls comprising cooperating belly and back bands, a crupper strap affixed at its forward end to the back band and having means for passing about the tail of the bull, a neck yoke, rear strut straps affixed to said crupper strap rearwardly remote from said back band and having other forward ends connected to said belly band, front strut straps affixed to the sides of said yoke at their forward ends and connected to said belly band at their rear ends, a shield hingedly suspended from said belly band for forward swinging movement and means operatively engaging said shield for locking said shield in a forward raised position.

2. An anti-breeding shield and harness for bulls as claimed in claim 1 wherein said locking means includes eyes swivelly carried by the forward lower portion of said shield and a flexible member threaded through said eyes and adapted to extend above a yoke strap for holding the shield elevated.

3. In an anti-breeding apparatus for bulls, adjustably connected and extensible back and belly bands, a strap attached transversely to the center part of the belly band and extending forwardly thereof and having a bifurcated outer end defining a neck yoke adapted to extend around the neck of a bull, a crupper strap affixed at its forward end to the back band and having means for passing about the tail of a bull, strut straps fixedly secured to the crupper strap and neck yoke and adjustably secured to the ends of the belly band, and a rigid shield suspended from the center of the belly band, said shield being hingedly secured at its upper edge to the belly band and mounted for forward swinging movement, retaining means formed on the forward face of the shield at its lower end and adjacent each side thereof and means engageable in said retaining means and over the strap forwardly of the belly band to lock the shield in a raised position.

JOHN E. MASSEY.

REFERENCES CITED

The following references are of record in the file of this patent:

UNITED STATES PATENTS

| Number | Name | Date |
| --- | --- | --- |
| 448,757 | Benedict | Mar. 24, 1891 |
| 486,766 | Chase | Nov. 22, 1892 |
| 1,514,919 | Millsap | Nov. 11, 1924 |
| 2,483,079 | Williams | Sept. 27, 1949 |